Nov. 15, 1949   W. P. HUNTLEY   2,488,085
CALIPER FOR CHART READING
Filed Feb. 27, 1948

INVENTOR.
Walter P. Huntley

Patented Nov. 15, 1949

2,488,085

UNITED STATES PATENT OFFICE 2,488,085

CALIPER FOR CHART READING

Walter P. Huntley, Arlington, Va., assignor to The Decca Record Company, Limited, London, England, a corporation of Great Britain Application February 27, 1948, Serial No. 11,419
In Great Britain October 11, 1946

Section 1, Public Law 690, August 8, 1946
Patent expires October 11, 1966

3 Claims. (Cl. 33—148)

1

This invention relates to measuring instruments, and has particular reference to an adjustable divider or caliper which finds particular utility when used as an aid to the reading of charts, maps, and the like which are drawn to a non-linear scale or based upon a non-linear coordinate system.

In the field of radio navigational aids, the charts employed are often drawn to a linear scale, but are based upon a non-linear coordinate system, as for example, the well known hyperbolic system. In the use of such charts, it is often desired to determine with some precision the coordinate location of a point of interest lying between two adjacent coordinate lines on the chart. Because of the divergence of such lines, and because the spacing of the lines along one axis is usually different from the spacing along the other axis, accurate estimation of the cordinates of the point is almost impossible. It therefore becomes necessary to measure the distance of separation of adjacent coordinate lines at the location of the point, and to measure the distance from the point to one of the lines, and then compute the coordinate value from the ratio between these measurements and the coordinate value of the spacing between adjacent lines.

It is therefore an object of this invention to provide a measuring instrument in the nature of a caliper for facilitating the determination of the coordinates of a point located on a chart of the character described.

It is also an object of this invention to provide a measuring instrument of the character referred to which includes an adjustable scale which may be adjusted to the dimensions of the chart at the point of interest and which includes a pointer movable to coincidence with the point of interest and disposed to indicate on the scale the distance from the point to one of the coordinate lines in terms of the coordinate spacing of such lines.

It is another object of this invention to provide a measuring instrument of the character set forth in the preceding paragraphs which includes three pointers movable with respect to each other into registration with the point of interest and the coordinate lines on either side thereof, together with a scale disposed to indicate with reference to the position of one of the pointers the distance from the point of interest to one of the coordinate lines in terms of the coordinate value of the spacing between said lines.

Other objects and advantages of this invention will be apparent from a study of the following

2 specification, read in connection with the accompanying drawings, wherein:

Figure 1:
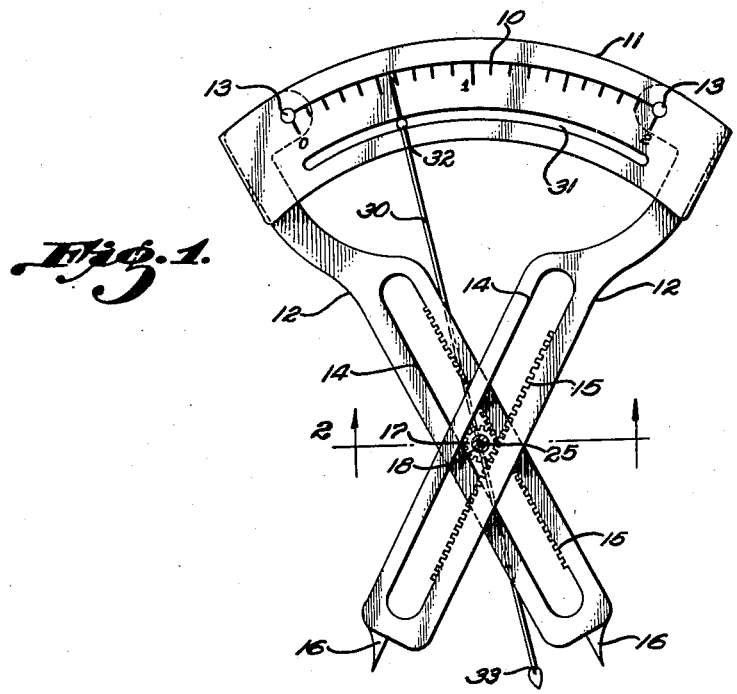
Fig. 1 is a side elevational view of one form of the invention.

In accordance with the preferred embodiment of the invention (Figs. 1 and 2), an arcuate-shaped scale 10 is provided on a strip of material 11, to each end of which is attached an arm 12 by a pivot pin 13. Each arm is formed with a longintudinal slot 14, and one edge of each slot is provided with a toothed rack 15. The free extremity of each arm is provided with a pointer 16. A pinion is arranged to extend through each slot for a part of the thickness of each arm. The pinion 17 is provided with a hollow stem 18 (see Fig. 2) which projects out beyond the face of one slotted arm, which stem is encircled by a washer 19 which bears on the outer face of said slotted arm and has a reduced portion 20 which projects into and is a sliding fit in the slot. A similar washer 21 engages the outer face of the other slotted arm and is provided with a countersunk hole 22 in which the head 23 of a clamping member is retained by a spring ring 24. The clamping member comprises a spindle 25 secured to said head and extending through the hollow spindle 18 of the pinion. The projecting end of the spindle 18 has secured to it a manipulating knob 26 for rotating it, which knob is provided with a central recess 27 in which is located a clamping nut 28 which encircles the threaded end of the clamping spindle 25. A suitable spring washer 29 is provided between the clamping nut and the bottom of the latter recess to draw the members 19 and 21 toward each other and provide sufficient friction to hold the members 19 and 21 against inadvertent sliding movement along the slots 14. The aforesaid head of the clamping means is provided with a diametrically extending hole in which is slidably mounted a thin rod-like pointer 30, one end of which is split so as to lie on either side of the face of the aforesaid scale 10. The strip 11 on which the scale is formed may be provided with an arcuate slot 31 along which is guided a pin 32 through which the split rod passes, the other end of the rod being provided with a suitable pointer 33.

Figure 2:
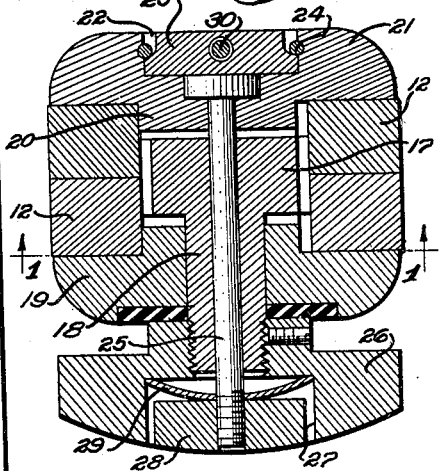
Fig. 2 is a cross-sectional view taken substantially along the line 2—2 of Fig. 1.

By rotating the knob 26, the stem 18 is caused to move along both of the slots 14 so as to move the pointers 16 toward and away from each other. By this means the spacing between the pointers 16 may be adjusted to equality with the spacing between coordinate lines on opposite sides of the point of interest. The pointers 16 may then be held in registration with these two lines while the pointer 33 is moved to registration with the point of interest. The distance from the point of interest to one of the coordinate lines is then read as the position of the upper end of the pointer member 30 with respect to the scale 10. The scale 10 is shown as marked for use with charts having coordinate lines drawn every two units apart. If, for example, the left and right hand pointers 16 of Fig. 1 are placed on chart lines numbers 54 and 56, the coordinate value of a point registering with the pointer 33 would be read as 54.57.

Figure 3:
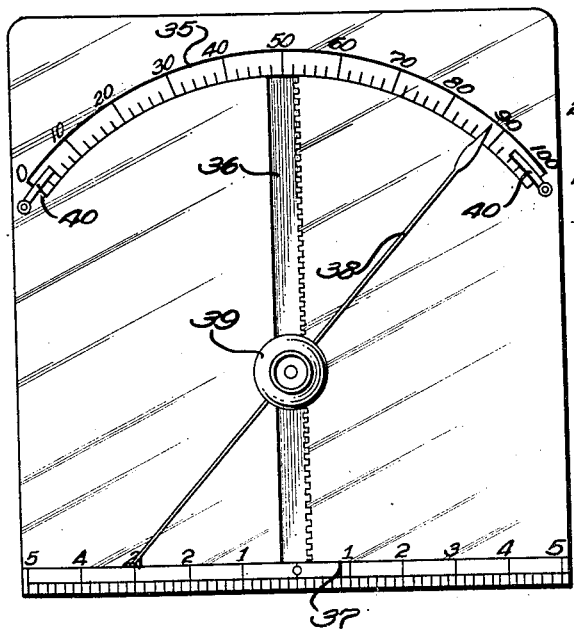
Fig. 3 is a side elevational view of a modified form of the invention.

An alternative and simpler construction is shown in Figure 3 and comprises a member fashioned from transparent sheet 34 and having at one end an arcuate scale 35 extending equally on either side of a center position from which extends a radial slot 36. A straight scale 37 is arranged at the opposite end of the slot extending on either side thereof at right angles thereto. which scale has equal measurements on either side of a zero position. A pointer rod 38 is longitudinally adjustable through a pivot member 39 which is slidable along said slot, the arrangement being such that the pointer rod may pivot about an axis at right angles to a plane containing the two scales. The pivot member may be mounted in two bushes screw-threaded into one another and having heads overlying the sheet so that by effecting relative rotation between the two bushes the pivot may be fixed against movement along the slot.

In use, the transparent member is placed flat on the chart with its straight scale extending across two hyperbolic lines so that they are opposite similar numerals on the scale thus centralizing the aforesaid slot with the required hyperbolic lines. The pointer rod is brought to one end of the arcuate scale where it may be retained temporarily by a spring detent 40 and the pivot member is then adjusted along the slot until the pointer rod reaches the intersection between the straight scale and one of the hyperbolic lines. The pivot member is then in an appropriate position for the further use of the instrument. Thus, if an indication is required of the position of a point between the hyperbolic lines along the straight scale, the end of the pointer rod may be brought opposite that point by the pivoting of the pivot member and if necessary by longitudinal movement of the rod through the pivot member. The position of the required point can then be read off the arcuate scale.

While there has been shown and described the preferred embodiments of this invention, the same is not to be limited to the details of construction described herein, except as defined in the appended claims.

I claim:

1. In a measuring instrument for making measurements on a chart, the combination of: a scale; a pair of arms; means pivotally securing one end of each of said arms to opposite ends of said scale, said arms being disposed in intersecting relation to each other, and each of said arms having a longitudinal slot formed therein; a chart engaging member on the other end of each of said arms; a pivotal mounting means passing through both of said slots at their point of intersection, said pivotal mounting means being longitudinally movable along both of said slots; and a pointer carried by said pivotal mounting means for movement of one end thereof over said scale as the other end thereof is moved over said chart.

2. In a measuring instrument for making measurements on a chart, the combination of: a scale; a pair of arms; means pivotally securing one end of each of said arms to opposite ends of said scale, said arms being disposed in intersecting relation to each other, and each of said arms having a longitudinal slot formed therein; a chart engaging member on the other end of each of said arms; a pivotal mounting means passing through both of said slots at their point of intersection, said pivotal mounting means being movable longitudinally along both of said slots; a pointer, and a pointer mounting means mounting said pointer on said pivotal mounting means for pivotal movement of said pointer to cause one end thereof to move over said scale as the other end thereof is moved over said chart, said pointer mounting means also providing for movement of said pivotal mounting means longitudinally of said pointer, whereby said pointer may be held against movement transversely of said scale as said pivotal mounting means is moved along said slots.

3. In a measuring instrument for making measurements on a chart, the combination of: a scale; a pair of arms; means pivotally securing one end of each of said arms to opposite ends of said scale, said arms being disposed in intersecting relation to each other, and each of said arms having a longitudinal slot formed therein; a chart engaging member on the other end of each of said arms; a pivotal mounting means passing through both of said slots at their point of intersection, said pivotal mounting means being longitudinally movable along both of said slots; means interengaging both of said arms with said pivotal mounting means for limiting the longitudinal movement along said slots to simultaneous movement in equal amounts; and a pointer carried by said pivotal mounting means for movement of one end thereof over said scale as the other end thereof is moved over said chart.

WALTER P. HUNTLEY.

REFERENCES CITED

The following references are of record in the file of this patent:

UNITED STATES PATENTS

| Number | Name | Date |
|---|---|---|
| 608,183 | Davis | Aug. 2, 1898 |
| 967,267 | Thompson | Aug. 16, 1910 |
| 1,321,924 | Kuldell | Nov. 18, 1919 |